(12) United States Patent
Imaizumi et al.

(10) Patent No.: US 11,084,199 B2
(45) Date of Patent: Aug. 10, 2021

(54) HONEYCOMB STRUCTURE FORMING DIE (71) Applicant: NGK INSULATORS, LTD., Nagoya (JP)

(72) Inventors: Yuta Imaizumi, Nagoya (JP); Kazuhiko Hamatsuka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 252 days.

(21) Appl. No.: 15/664,351

(22) Filed: Jul. 31, 2017

(65) Prior Publication Data
US 2018/0043596 A1 Feb. 15, 2018

(30) Foreign Application Priority Data

Aug. 9, 2016 (JP) .............................. JP2016-156974
Nov. 11, 2016 (JP) .............................. JP2016-220871

(51) Int. Cl.
*B29C 48/11* (2019.01)
*B28B 3/26* (2006.01)
*B29L 31/60* (2006.01)

(52) U.S. Cl.
CPC .............. *B29C 48/11* (2019.02); *B28B 3/269* (2013.01); *B29L 2031/608* (2013.01)

(58) Field of Classification Search
CPC ......... B29C 48/11; B29C 48/36; B29C 48/30; B28B 3/269; B29L 2031/608
USPC ....................................................... 425/461
See application file for complete search history.

(56) References Cited

U.S. PATENT DOCUMENTS

| 5,108,685 | A | 4/1992 | Kragle |
| 6,039,908 | A | 3/2000 | Brew et al. |
| 2015/0137431 | A1 | 5/2015 | Hayashi |

FOREIGN PATENT DOCUMENTS

| JP | S54-034355 U1 | 8/1952 |
| JP | 04-332604 A1 | 11/1992 |
| JP | 2011-121236 A | 6/2011 |
| JP | 2013-132879 A1 | 7/2013 |
| JP | 2013-132881 A1 | 7/2013 |
| JP | 2015-096310 A1 | 5/2015 |

OTHER PUBLICATIONS

Machine Translation of JP 2013-132879 (Year: 2013).*
(Continued)

*Primary Examiner* — Leith S Shafi
(74) *Attorney, Agent, or Firm* — Burr & Brown, PLLC (57) ABSTRACT

The honeycomb structure forming die includes a first die in which a central region on the side of a kneaded material discharging surface has a convex region projecting toward a downstream side in an extruding direction of a kneaded material, and a ring-shaped second die. In the first die, first kneaded material introducing holes are formed and latticed first slits are formed on the side of the kneaded material discharging surface of the convex region, and in the second die, there are formed second kneaded material introducing holes and latticed second slits communicating with the second kneaded material introducing holes, and the honeycomb structure forming die has a groove region where movement of the kneaded material is performed between the first kneaded material introducing hole and the second kneaded material introducing hole, in abutment surfaces of the first die and the second die.

11 Claims, 7 Drawing Sheets

(56) References Cited

OTHER PUBLICATIONS

Japanese Office Action (with English translation), Japanese Application No. 2016-220871, dated Mar. 12, 2019 (6 pages).
German Office Action (with English translation), German Application No. 10 2017 213 529.8, dated Feb. 18, 2021 (22 pages).

* cited by examiner

HONEYCOMB STRUCTURE FORMING DIE

"The present application is an application based on JP-2016-156974 filed on Aug. 9, 2016 and JP-2016-220871 filed on Nov. 11, 2016 with Japan Patent Office, the entire contents of which are incorporated herein by reference."

BACKGROUND OF THE INVENTION

Field of the Invention

The present invention relates to a honeycomb structure forming die, and more particularly, it relates to a honeycomb structure forming die which is capable of forming, in a high quality, a honeycomb formed body having a central portion different from a circumferential portion in cell structure.

Description of the Related Art

Heretofore, a honeycomb structure onto which a catalyst is loaded has been used for a purifying treatment of toxic substances such as HC, CO and $NO_x$ included in an exhaust gas emitted from an engine of a car or the like. Further in the honeycomb structure, plugging portions are applied to open ends of cells defined by porous partition walls, whereby the honeycomb structure is also used as an exhaust gas purifying filter.

Honeycomb structures are pillar-shaped structures each including partition walls defining a plurality of cells which become through channels for an exhaust gas. Such a honeycomb structure has a cell structure in which a plurality of cells are regularly arranged at predetermined cycles in a plane perpendicular to an extending direction of the cells. Heretofore, there has been one type of cell structure in the above plane of one honeycomb structure, but in recent years, there has been suggested a honeycomb structure having two or more types of cell structures in the above plane for the purpose of improvement of an exhaust gas purifying efficiency, or the like. For example, there has been suggested a honeycomb structure in which a central portion is different from a circumferential portion in cell density or cell shape in a plane perpendicular to a cell extending direction, whereby the honeycomb structure has two types of cell structures in the above plane.

This honeycomb structure is manufactured by forming a kneaded material including a ceramic forming raw material with an extruding die to prepare a honeycomb formed body and then drying and firing the prepared honeycomb formed body. For example, the die is prepared as a honeycomb structure forming die by forming, in a die substrate made of a metal, back holes into which the kneaded material is introduced and slits which communicate with the back holes (e.g., see Patent Documents 1 to 4). Hereinafter, the honeycomb structure forming die will be referred to simply as "a forming die" or "a die" sometimes.

[Patent Document 1] JP-A-2015-096310
[Patent Document 2] JP-A-2013-132879
[Patent Document 3] JP-A-2013-132881
[Patent Document 4] JP-A-H04-332604

SUMMARY OF THE INVENTION

For example, a die described in Patent Document 1 includes a first mold positioned on an upstream side in an extruding direction of a raw material and a second mold positioned on a downstream side. The above first mold has convex regions projecting from a periphery on the downstream side in the extruding direction, and the above second mold has through-holes which fit with the convex regions. In the die described in Patent Document 1, the convex regions of the first mold are inserted into the through-holes of the second mold to combine the first mold and the second mold into one die.

However, the die described in Patent Document 1 has the problem that there are restrictions on design when the die is used in forming a honeycomb formed body to prepare a honeycomb structure having two types of cell structures. In other words, usually in the die to form the honeycomb formed body, "latticed slits" corresponding to a cell structure of the honeycomb formed body are formed on the side of a kneaded material discharging surface of a die substrate. Further in such a die, back holes are formed as raw material supply holes which communicate with intersection points of the latticed slits. In the die described in Patent Document 1, in circumstances where the first mold is different from the second mold in shape of the respective slits, it is difficult to completely match all back holes (i.e., first raw material supply holes) in the first mold with all back holes (i.e., second raw material supply holes) in the second mold. When all the back holes do not match one another and when the first mold and the second mold are combined into one piece, movement of the kneaded material in the die is obstructed and it becomes difficult to perform uniform extrusion. Consequently, in the die described in Patent Document 1, it is necessary to select the shapes of the respective slits formed in the first mold and the second mold so that the above-mentioned movement of the kneaded material is not obstructed, and a degree of freedom in design is very low.

Each of dies described in Patent Documents 2 and 3 is not a die to form a honeycomb formed body having two types of cell structures, but is a die for the purpose of improvement of cell quality only in an outermost circumferential portion. Furthermore, the dies described in Patent Documents 2 and 3 have the problem that the dies are not compatible with formation of various honeycomb formed bodies in which shapes of two types of cell structures and their formation regions vary over broad ranges. For example, a honeycomb structure having two types of cell structures occasionally has a boundary wall disposed to surround the cell structure of a central portion in a boundary between the cell structure of the central portion and the cell structure of a circumferential portion. During extrusion, the boundary wall requires a large amount of kneaded material of a forming raw material as compared with partition walls constituting the cell structures of the central portion and the circumferential portion. When the honeycomb formed body having such a boundary wall as described above is formed with one of the dies described in Patent Documents 2 and 3, the requirement exceeds supply of the kneaded material to form the boundary wall, and formation defects might be caused in the boundary wall and its vicinity. Furthermore, each of the dies described in Patent Documents 2 and 3 has been developed for the purpose of the improvement of the cell quality only in the outermost circumferential portion, and hence there is a problem in strength of a shell region. When the problem is to be solved only by simply enlarging a forming range of the shell region, there is the fear of the problem that the shell region is deformed.

A die described in Patent Document 4 has a structure in which adjacent die bodies are tightened with wedges or engaged with each other by utilizing a pressing pressure, and hence there is the problem that pressure resisting properties to a kneaded material are low and that the die is easy to break. The die described in Patent Document 4 also has the problem that positional shifts of back holes are likely to be induced and that formation defects are likely to be generated.

The present invention has been developed in view of the above-mentioned problems, and an object thereof is to provide a honeycomb structure forming die which is capable of forming, in a high quality, a honeycomb formed body having a central portion different from a circumferential portion in cell structure.

According to the present invention, there is provided a honeycomb structure forming die as follows.

According to a first aspect of the present invention, a honeycomb structure forming die is provided including:

a first die which is disposed on an upstream side in an extruding direction of a kneaded material of a forming raw material and in which a central region on the side of a kneaded material discharging surface has a convex region projecting toward a downstream side in the extruding direction; and a ring-shaped second die which is disposed on the downstream side of the first die and which possesses a shape complementary to the convex region, wherein in the central region of the first die, first kneaded material introducing holes and latticed first slits communicating with the first kneaded material introducing holes are formed, in a circumferential region surrounding the central region of the first die, the first kneaded material introducing holes are formed to pass through the circumferential region of the first die, in the ring-shaped second die, there are formed second kneaded material introducing holes into which the kneaded material discharged from the first kneaded material introducing holes formed in the circumferential region of the first die is introduced, and latticed second slits communicating with the second kneaded material introducing holes, and opening positions of the first kneaded material introducing holes of the circumferential region of the first die do not match opening positions of the second kneaded material introducing holes of the second die in at least a part of the honeycomb structure forming die, the honeycomb structure forming die having a clearance region to extrude the kneaded material into a ring shape, between an outer peripheral surface of the convex region of the first die and an inner peripheral surface of the ring-shaped second die, and having a groove region in which movement of the kneaded material is performed between the first kneaded material introducing hole and the second kneaded material introducing hole, in abutment surfaces of the first die and the second die.

According to a second aspect of the present invention, the honeycomb structure forming die according to the above first aspect is provided, wherein a shape of the first slits is different from a shape of the second slits.

According to a third aspect of the present invention, the honeycomb structure forming die according to the above first or second aspects is provided, wherein the groove region is formed in the second die.

According to a fourth aspect of the present invention, the honeycomb structure forming die according to any one of the above first to third aspects is provided, wherein a width of the groove region is from 0.1 to 1.5 mm.

According to a fifth aspect of the present invention, the honeycomb structure forming die according to any one of the above first to fourth aspects is provided, wherein a depth of grooves of the groove region is from 0.1 to 5.0 mm.

According to a sixth aspect of the present invention, the honeycomb structure forming die according to any one of the above first to fifth aspects is provided, wherein a ratio, to an area of a range where the groove region is formed in the abutment surface of the second die, of a total area of the groove region and open ends of the second kneaded material introducing holes in the range is from 40 to 90%.

According to a seventh aspect of the present invention, the honeycomb structure forming die according to any one of the above first to sixth aspects is provided, wherein a ratio of an area of the central region of the first die to an area of an end face of a honeycomb formed body to be extruded is from 30 to 70%.

According to an eighth aspect of the present invention, the honeycomb structure forming die according to any one of the above first to seventh aspects of the present invention is provided, wherein slits surrounding one cell among the first slits and slits surrounding one cell among the second slits extend in mutually intersecting directions.

According to a ninth aspect of the present invention, the honeycomb structure forming die according to any one of the above first to eighth aspects of the present invention is provided, wherein an arranging direction of a cell structure of the honeycomb formed body which is to be extruded through the first slits and an arranging direction of a cell structure of the honeycomb formed body which is to be extruded through the second slits extend in mutually intersecting directions.

According to a tenth aspect of the present invention, the honeycomb structure forming die according to any one of the above first to ninth aspects is provided, wherein in the first die, the central region is the same as the circumferential region in an opening diameter of the first kneaded material introducing hole and an interval between the first kneaded material introducing holes.

According to an eleventh aspect of the present invention, the honeycomb structure forming die according to any one of the above first to tenth aspects is provided, having two or more second dies, wherein the second die is replaced, whereby a depth of grooves of the groove region is changeable.

According to a twelfth aspect of the present invention, the honeycomb structure forming die according to any one of the above first to eleventh aspects is provided, having two or more first dies, wherein the first die is replaced, whereby a depth of grooves of the groove region is changeable.

A honeycomb structure forming die of the present invention includes a first die in which a central region on the side of a kneaded material discharging surface has a convex region projecting toward a downstream side in an extruding direction of a kneaded material, and a ring-shaped second die which possesses a shape complementary to the convex region of the first die. Furthermore, the honeycomb structure forming die of the present invention has a groove region in which movement of the kneaded material is performed between each first kneaded material introducing hole and each second kneaded material introducing hole, in abutment surfaces of the first die and the second die.

The honeycomb structure forming die of the present invention is capable of forming, in a high quality, a honeycomb formed body having a central portion different from a circumferential portion in cell structure. In other words, even when positions of the first kneaded material introducing holes of the first die do not match positions of the second kneaded material introducing holes of the second die, a flow rate distribution of the kneaded material to be introduced into the second kneaded material introducing holes can be uniformized by the groove region formed in the abutment surfaces of the first die and the second die. Therefore, the honeycomb structure forming die of the present invention is capable of uniformizing an amount of the kneaded material to be discharged from second slits of the second die, and forming the honeycomb formed body in a high quality.

Furthermore, according to the honeycomb structure forming die of the present invention, even when a back pressure is generated in the die at a time of die replacement or at the stop of ram molding, it is possible to effectively inhibit deformation of the second die.

DESCRIPTION OF THE PREFERRED EMBODIMENTS

Hereinafter, embodiments of the present invention will specifically be described with reference to the drawings. It should be understood that the present invention is not restricted to the following embodiments and that design changes, improvements and the like are suitably addable on the basis of ordinary knowledge of a person skilled in the art without departing from the gist of the present invention.

Figure 1:
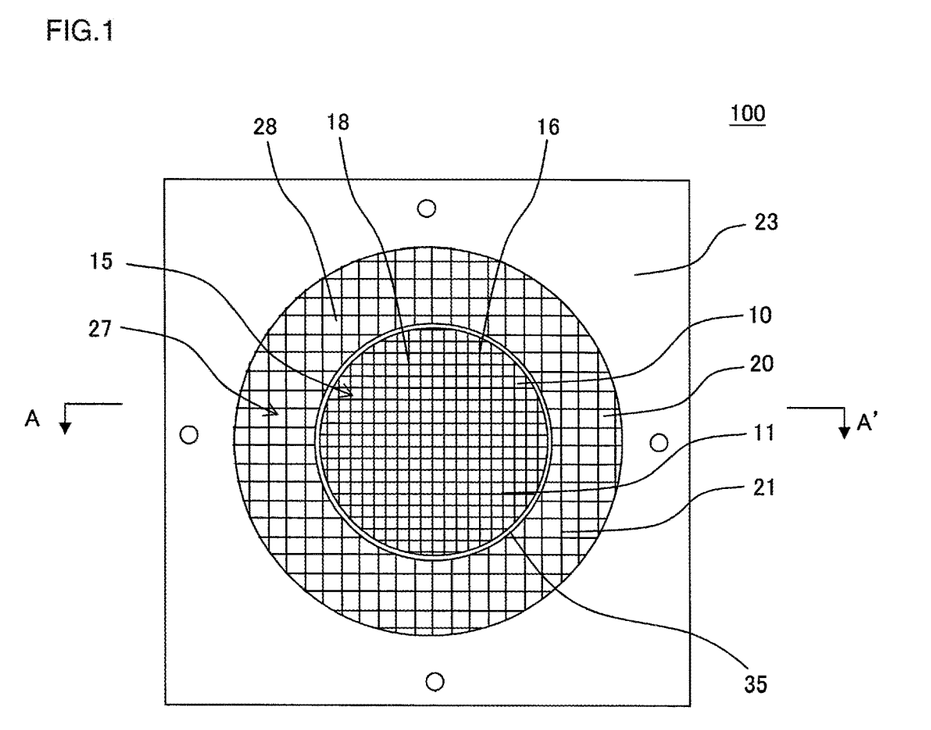
FIG. 1 is a plan view schematically showing a kneaded material discharging surface side of one embodiment of a honeycomb structure forming die of the present invention.
Figure 2:
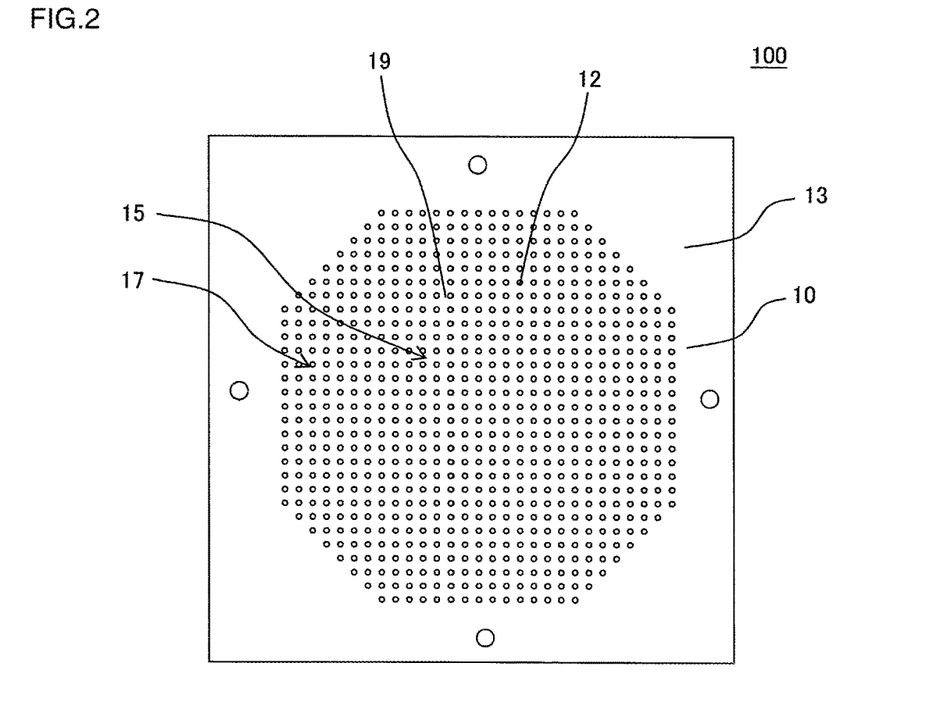
FIG. 2 is a plan view of a kneaded material introducing surface side of the honeycomb structure forming die shown in FIG. 1.
Figure 3:
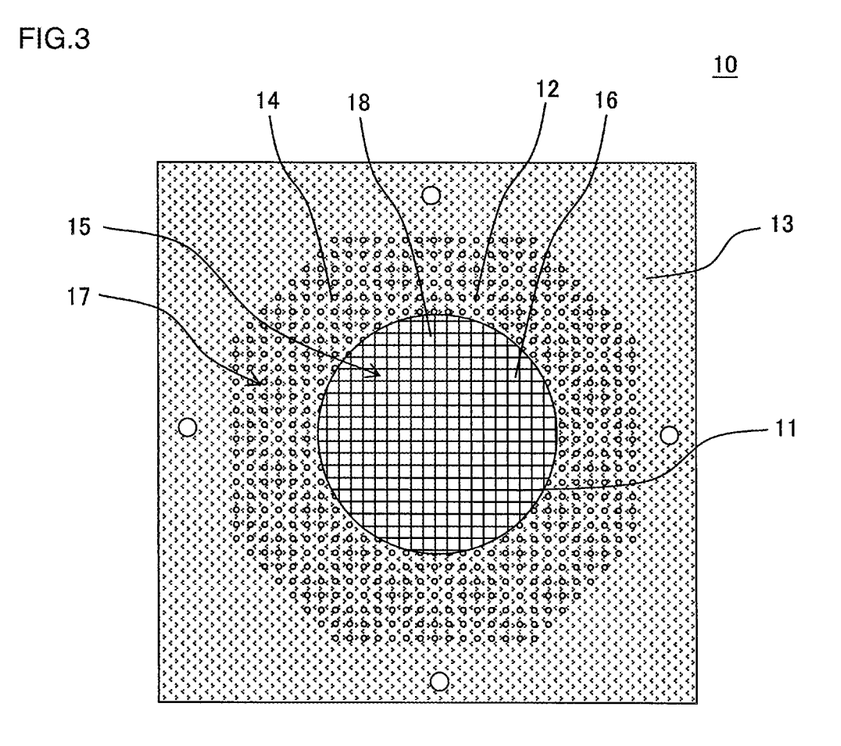
FIG. 3 is a plan view of a kneaded material discharging surface side of a first die constituting the honeycomb structure forming die shown in FIG. 1.
Figure 4:
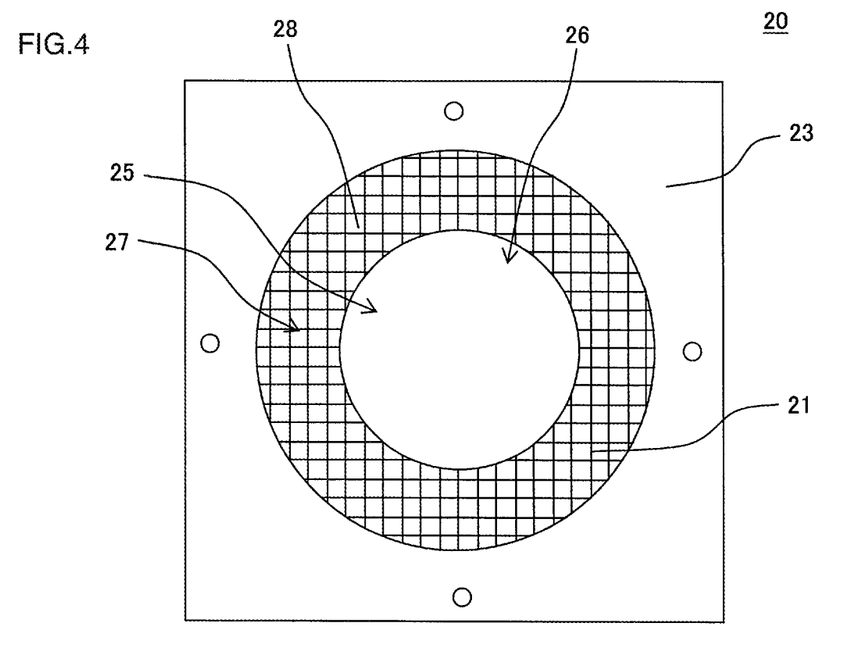
FIG. 4 is a plan view of a kneaded material discharging surface side of a second die constituting the honeycomb structure forming die shown in FIG. 1.
Figure 5:
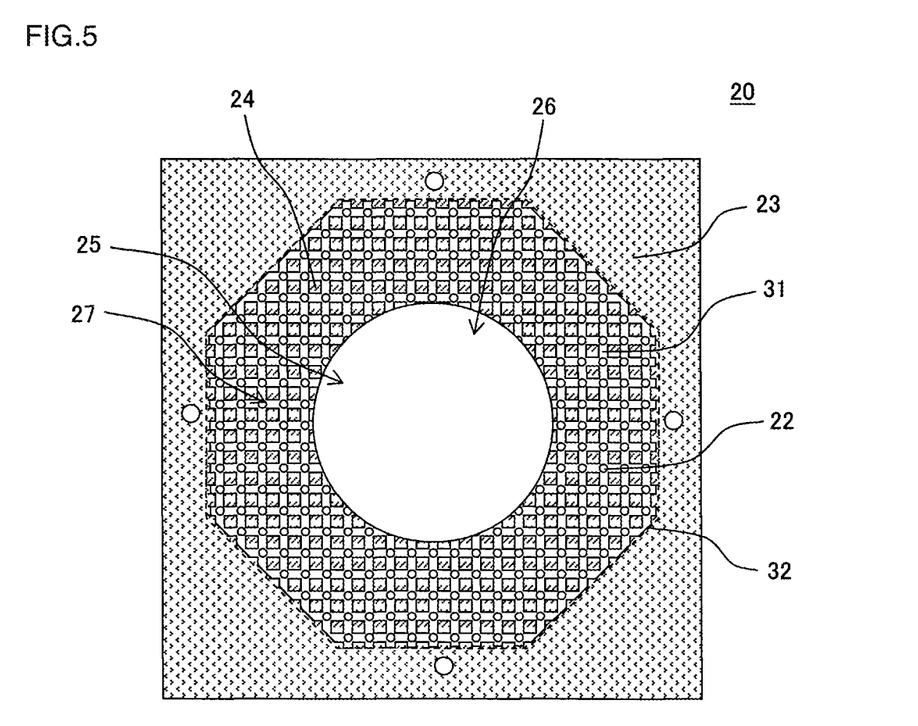
FIG. 5 is a plan view of a kneaded material introducing surface side of the second die constituting the honeycomb structure forming die shown in FIG. 1.
Figure 6:
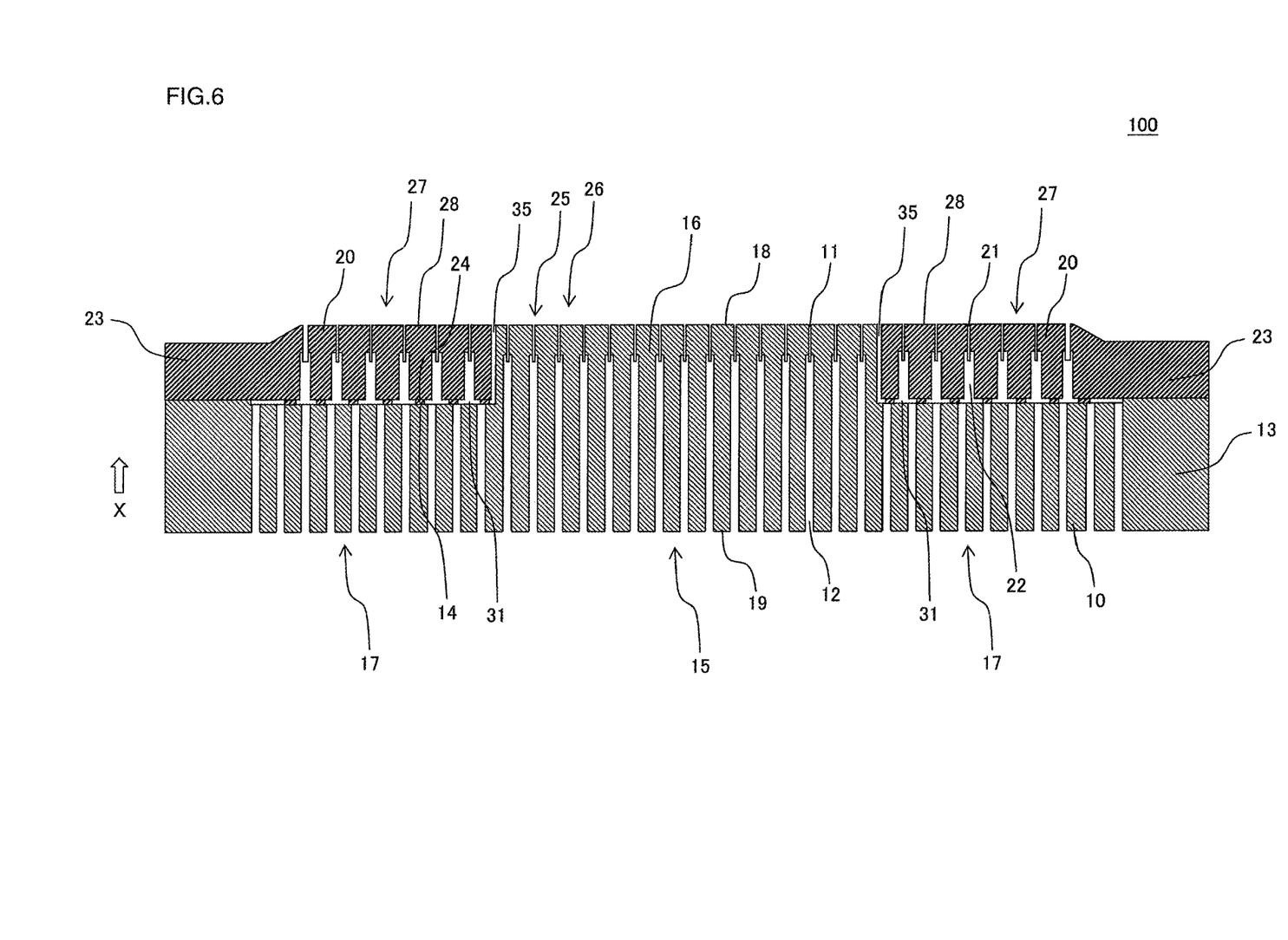
FIG. 6 is a cross-sectional view schematically showing a cross section taken along the A-A' line of the honeycomb structure forming die shown in FIG. 1.
Figure 7:
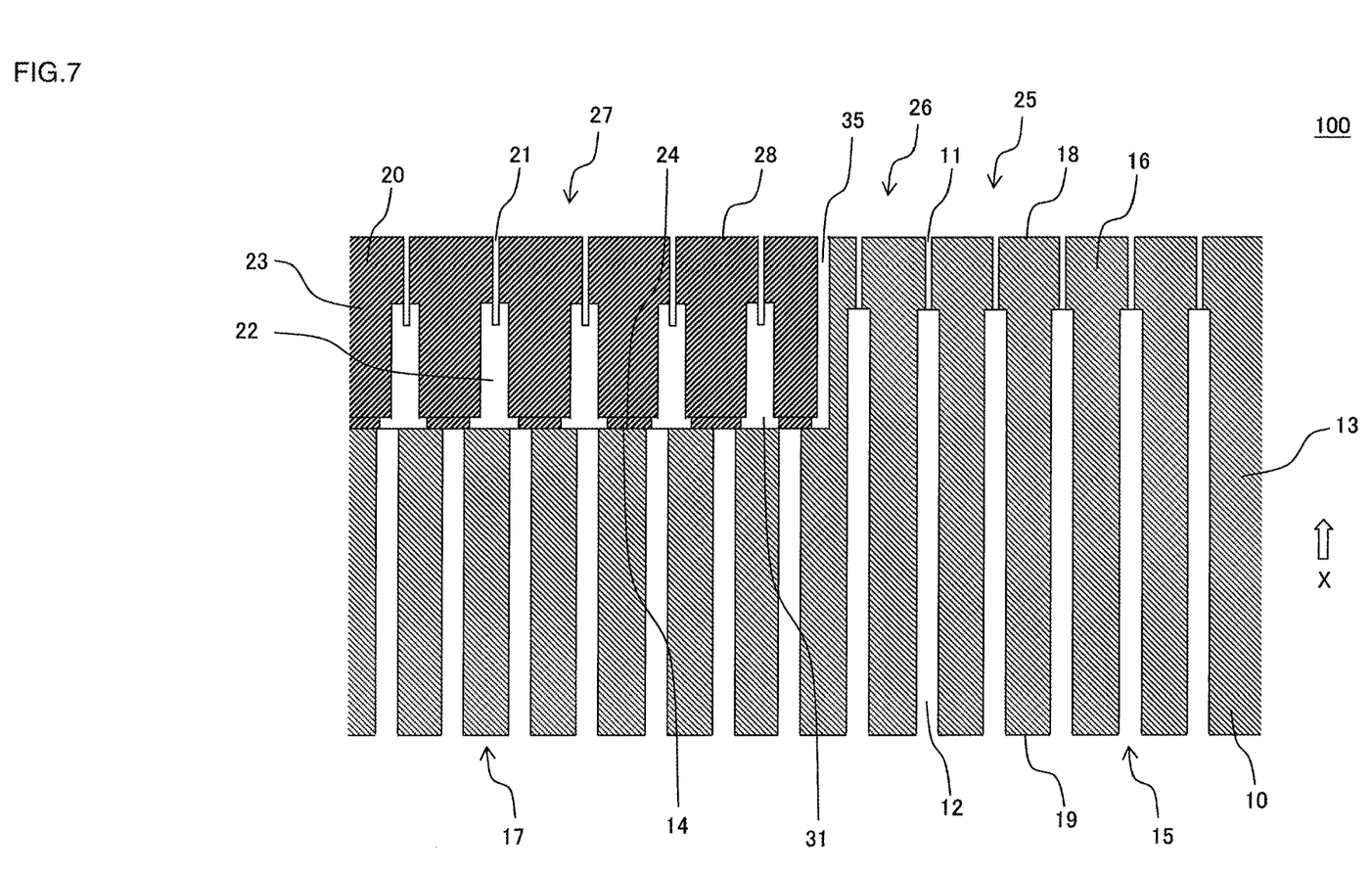
FIG. 7 is an enlarged cross-sectional view of an enlarged part of FIG. 6.

(1) Honeycomb Structure Forming Die:

One embodiment of a honeycomb structure forming die of the present invention will be described. Here, FIG. 1 is a plan view schematically showing a kneaded material discharging surface side of the one embodiment of the honeycomb structure forming die of the present invention. FIG. 2 is a plan view of a kneaded material introducing surface side of the honeycomb structure forming die shown in FIG. 1. FIG. 3 is a plan view of a kneaded material discharging surface side of a first die constituting the honeycomb structure forming die shown in FIG. 1. FIG. 4 is a plan view of a kneaded material discharging surface side of a second die constituting the honeycomb structure forming die shown in FIG. 1. FIG. 5 is a plan view of a kneaded material introducing surface side of the second die constituting the honeycomb structure forming die shown in FIG. 1. FIG. 6 is a cross-sectional view schematically showing a cross section taken along the A-A' line of the honeycomb structure forming die shown in FIG. 1. FIG. 7 is an enlarged cross-sectional view of an enlarged part of FIG. 6. It is to be noted that in FIG. 3 and FIG. 5, abutment surfaces of the first die and the second die are shown with hatchings, respectively.

As shown in FIG. 1 to FIG. 7, a honeycomb structure forming die 100 of the present embodiment includes a first die 10 and a second die 20. The first die 10 is disposed on an upstream side in an extruding direction X of a kneaded material of a forming raw material, and a central region 15 on the side of a kneaded material discharging surface 18 has a convex region 16 projecting toward a downstream side in the extruding direction. The second die 20 is a ring-shaped die which is disposed on the downstream side of the first die 10 and which possesses a shape complementary to the convex region 16 of the first die 10. Hereinafter, the honeycomb structure forming die 100 of the present embodiment will be referred to as simply as "the die 100" sometimes. The extruding direction X of the kneaded material is an extruding direction in performing extrusion by use of the die 100 of the present embodiment, and the direction extends from a kneaded material introducing surface 19 toward the kneaded material discharging surface 18.

According to the die 100 of the present embodiment, in the central region 15 of the first die 10, first kneaded material introducing holes 12 and latticed first slits 11 communicating with the first kneaded material introducing holes 12 are formed. The first kneaded material introducing holes 12 are formed coaxially with intersection points of the latticed first slits 11 in the extruding direction X. In other words, the first kneaded material introducing holes 12 communicate with the intersection points of the latticed first slits 11. In a circumferential region 17 surrounding the central region 15 of the first die 10, the first kneaded material introducing holes 12 are formed to pass through the circumferential region 17 of the first die 10.

In the ring-shaped second die 20, there are formed second kneaded material introducing holes 22 into which the kneaded material discharged from the first kneaded material introducing holes 12 formed in the circumferential region 17 of the first die 10 is introduced, and latticed second slits 21 communicating with the second kneaded material introducing holes 22. The second kneaded material introducing holes 22 are formed coaxially with intersection points of the latticed second slits 21 in the extruding direction X. In other words, the second kneaded material introducing holes 22 communicate with the intersection points of the latticed second slits 21. The die 100 of the present embodiment is also constituted so that opening positions of the first kneaded material introducing holes 12 of the circumferential region 17 of the first die 10 do not match opening positions of the second kneaded material introducing holes 22 of the second die 20 in at least a part of the die.

In the die 100 of the present embodiment, the first die 10 and the second die 20 are combined into one piece so that an end face of the circumferential region 17 of the first die 10 on the downstream side in the extruding direction X abuts on an end face of the ring-shaped second die 20 on the upstream side in the extruding direction X. Hereinafter, the end face of the circumferential region 17 of the first die 10 on the downstream side in the extruding direction X will be referred to as "an abutment surface 14 of the first die 10" and the end face of the ring-shaped second die 20 on the upstream side in the extruding direction X will be referred to as "an abutment surface 24 of the second die 20" sometimes. Furthermore, when the upstream side is simply mentioned, the upstream side in the extruding direction X is meant, and when the downstream side is simply mentioned, the downstream side in the extruding direction X is meant.

The die 100 of the present embodiment has a groove region 31 where the movement of the kneaded material is performed between the first kneaded material introducing hole 12 and the second kneaded material introducing hole 22, in the abutment surfaces 14 and 24 of the first die 10 and the second die 20.

The die 100 of the present embodiment has a clearance region 35 to extrude the kneaded material into a ring shape, between an outer peripheral surface of the convex region 16 of the first die 10 and an inner peripheral surface of the ring-shaped second die 20. In other words, in the die 100 of the present embodiment, a cavity region 26 in a central region 25 of the second die 20 is formed to be slightly larger than a peripheral edge of the convex region 16 of the first die 10. According to this constitution, when the first die is combined with the second die to insert the convex region 16 of the first die 10 into the cavity region 26 of the ring-shaped second die 20, the ring-shaped clearance region 35 is formed between the convex region 16 of the first die 10 and the second die 20. The ring-shaped clearance region 35 functions as the clearance region 35 to form a boundary wall of a honeycomb formed body. In the present invention, "the ring-shaped second die 20 possessing a shape complementary to the convex region 16 of the first die 10" means a ring-shaped die having the cavity region 26 which has the same shape as in the convex region 16 of the first die 10 or is slightly larger than the convex region 16 of the first die 10.

In the die 100 of the present embodiment, an end face of the first die 10 on the upstream side in the extruding direction X is the kneaded material introducing surface 19 of the whole die 100. Therefore, during extrusion, the kneaded material of the forming raw material is initially introduced into the first kneaded material introducing holes 12 opened in the kneaded material introducing surface 19 of the first die 10. The kneaded material introduced into the first kneaded material introducing holes 12 of the central region 15 of the first die 10 moves to the latticed first slits 11 communicating with the first kneaded material introducing holes 12, and is discharged as a formed body corresponding to a shape of the first slits 11 from the kneaded material discharging surface 18 of the first die. On the other hand, the kneaded material introduced into the first kneaded material introducing holes 12 of the circumferential region 17 of the first die 10 is discharged from an abutment surface 14 side of the first die 10, and introduced into the second kneaded material introducing holes 22 of the second die 20 through the groove region 31. In this case, even when positions of the first kneaded material introducing holes 12 of the first die 10 do not match those of the second kneaded material introducing holes 22 of the second die 20, a flow rate distribution of the kneaded material can be uniformized by the groove region 31 formed in the abutment surfaces 14 and 24 of the first die 10 and the second die 20. The kneaded material introduced into the second kneaded material introducing holes 22 of the second die 20 moves to the latticed second slits 21 communicating with the second kneaded material introducing holes 22, and is discharged as a formed body corresponding to a shape of the second slits 21 from a kneaded material discharging surface 28 of the second die. Therefore, the die 100 of the present embodiment is capable of uniformizing an amount of the kneaded material to be discharged from the second slits 21 of the second die 20 and forming the honeycomb formed body in a high quality. Furthermore, the groove region 31 also communicates with the clearance region 35 to extrude the kneaded material into the ring shape, and hence the kneaded material introduced into the first kneaded material introducing holes 12 of the circumferential region 17 of the first die 10 is also introduced into the clearance region 35 through the groove region 31. Therefore, a flow rate distribution of the kneaded material to be introduced into the clearance region 35 can be uniformized, and it is also possible to especially effectively inhibit generation of formation defects around the boundary wall of the honeycomb formed body to be extruded. Consequently, the die 100 of the present embodiment is especially capable of forming, in a high quality, the honeycomb formed body having a central portion different from a circumferential portion in cell structure.

In the present description, "the cell structure" means a structure of a honeycomb structure which is directed in accordance with a partition wall thickness, a cell density, and a cell shape. Furthermore, "the shape of the slits" means the shape of the slits which is directed in accordance with a width, a depth and a length of each slit formed in the die and a mutually connecting configuration of the slits.

Furthermore, the abutment surfaces 14 and 24 of the first die 10 and the second die 20 are in contact with each other except a region where the groove region 31 is formed, and hence it is possible to effectively inhibit deformation of the second die 20. For example, when the end face of the circumferential region 17 of the first die 10 on the downstream side does not abut on the end face of the second die 20 on the upstream side and the second die 20 is in a cantilever-like state, the second die 20 might be deformed by generation of a back pressure in the die 100 at a time of die replacement or at the stop of ram molding.

Furthermore, according to the die 100 of the present embodiment, even when the honeycomb formed body has the boundary wall in a boundary between the central portion and the circumferential portion, supply of the kneaded material to form the boundary wall can sufficiently be acquired by the groove region 31. Consequently, the die 100 of the present embodiment is capable of effectively preventing generation of formation defects in the boundary wall and its vicinity in the honeycomb formed body.

Furthermore, although not shown in the drawings, in the die of the present embodiment, a plurality of types of second dies which are different in shape of the second slits may separately be prepared, and the second die is replaceable for use in accordance with the cell structure of the honeycomb formed body to be formed. The second kneaded material introducing holes of the second die are formed coaxially with the intersection points of the latticed second slits in the extruding direction, and hence the respective opening positions of the second kneaded material introducing holes in the abutment surface vary in accordance with the shape of the second slits of the second die. The die of the present embodiment has the groove region in the mutual abutment surfaces, and hence even when the second die having a different shape of the second slits is used, uniform extrusion can always be achieved in the central region and circumferential region without obstructing the movement of the kneaded material in the die.

Figure 8:
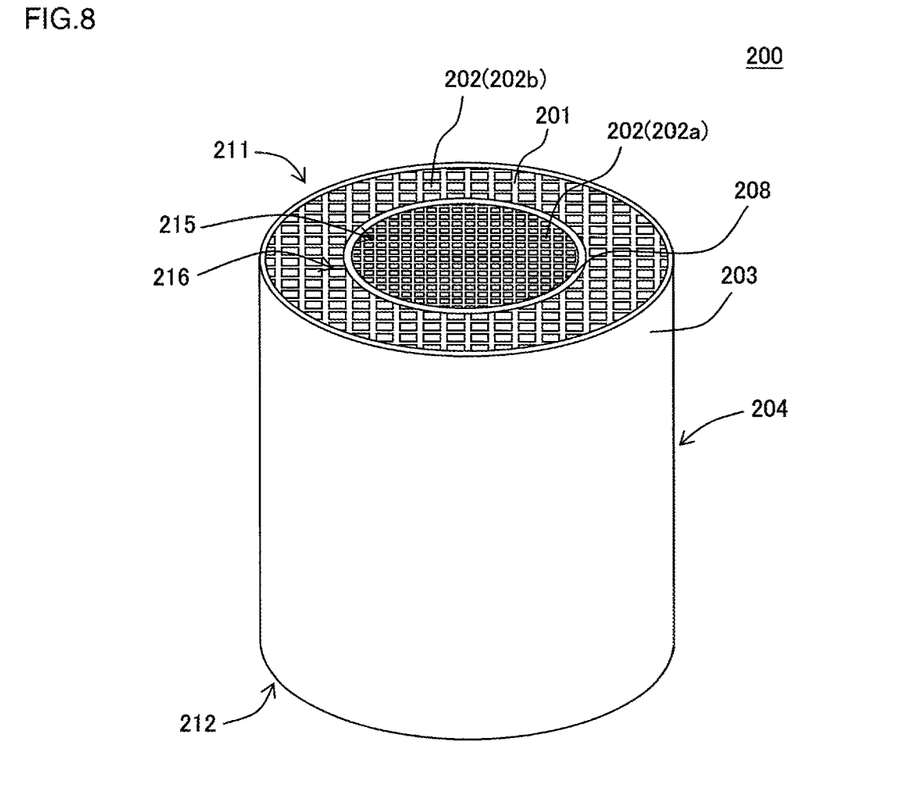
FIG. 8 is a perspective view schematically showing one example of a honeycomb structure prepared by the honeycomb structure forming die of the present invention.
Figure 9:
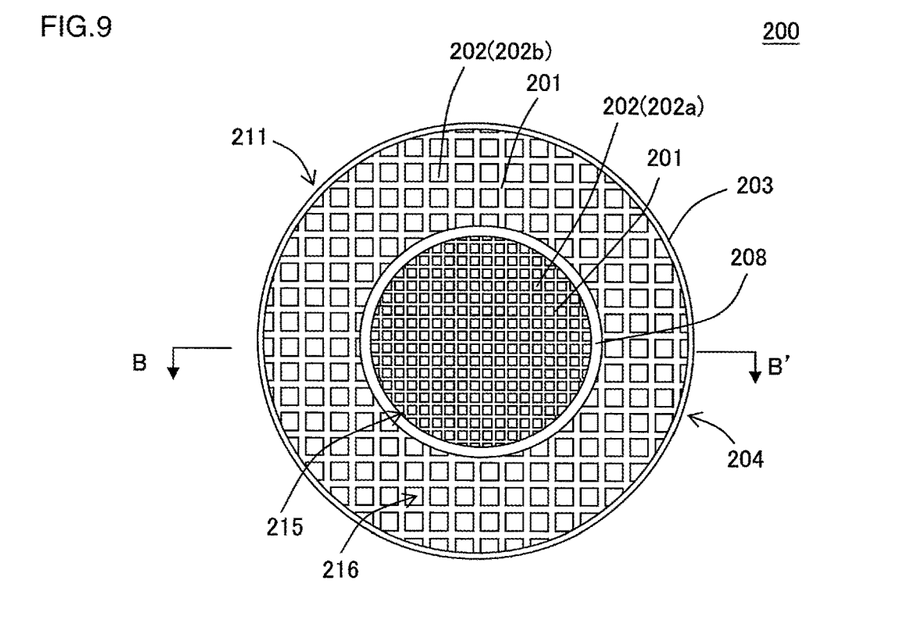
FIG. 9 is a plan view schematically showing an inflow end face of the honeycomb structure shown in FIG. 8.
Figure 10:
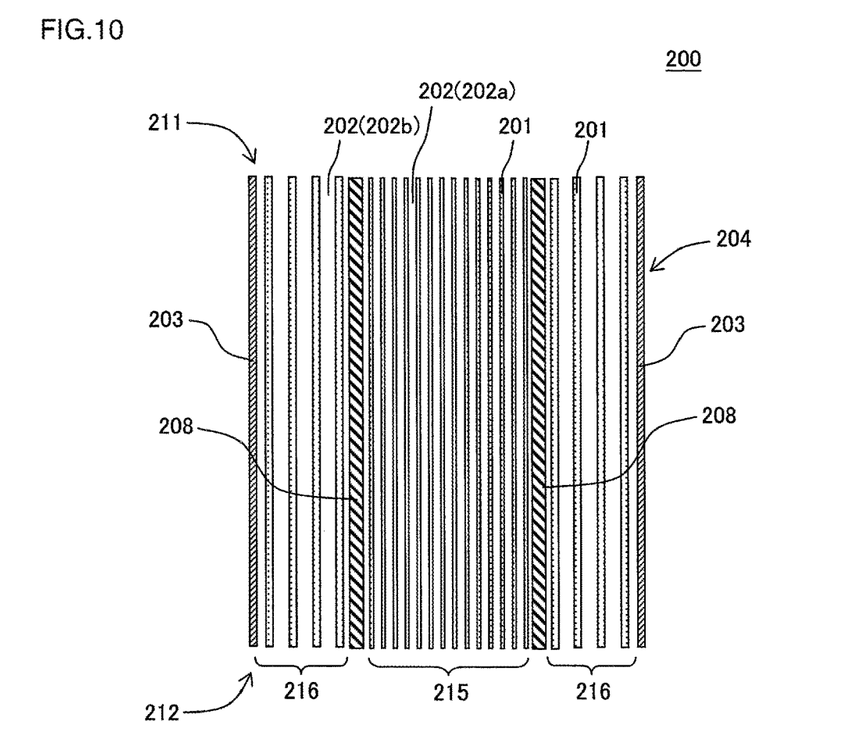
FIG. 10 is a cross-sectional view schematically showing a cross section taken along the B-B' line of FIG. 9.

Here, the honeycomb structure prepared by the honeycomb structure forming die of the present embodiment is described. FIG. 8 is a perspective view schematically showing one example of the honeycomb structure prepared by the honeycomb structure forming die of the present invention. FIG. 9 is a plan view schematically showing an inflow end face of the honeycomb structure shown in FIG. 8. FIG. 10 is a cross-sectional view schematically showing a cross section taken along the B-B' line of FIG. 9.

A honeycomb structure 200 shown in FIG. 8 to FIG. 10 includes a pillar-shaped honeycomb structure body 204 having porous partition walls 201 and a circumferential wall 203 disposed to surround a circumference of the partition walls 201. The partition walls 201 of the honeycomb structure body 204 define a plurality of cells 202 which extend from an inflow end face 211 to an outflow end face 212 and become through channels for a fluid. Furthermore, the honeycomb structure body 204 has a central cell structure 215, a circumferential cell structure 216, and a boundary wall 208 disposed in a boundary portion between the circumferential cell structure 216 and the central cell structure 215. In the honeycomb structure body 204, the central cell structure 215 and the circumferential cell structure 216 are different cell structures.

Here, the central cell structure 215 is a cell structure constituted by a plurality of cells 202a formed in a central portion of the honeycomb structure body 204 in a plane of the honeycomb structure body 204 which is perpendicular to an extending direction of the cells 202. The circumferential cell structure 216 is a cell structure constituted by a plurality of cells 202b formed closer to a circumference of the honeycomb structure body 204 than to the central portion of the honeycomb structure body in the above plane.

"The cell structure" is a structure formed by a set of repeating units, and one repeating unit corresponds to one cell 202 defined by the partition walls 201 or a combination of a plurality of cells 202 in the plane perpendicular to the extending direction of the cells 202. For example, when the cells having the same shape are regularly arranged in the above plane, a range where the cells having the same shape are present becomes one cell structure. Furthermore, when a combination of a plurality of cells which are different in cell shape constitutes one repeating unit, a range where the repeating unit is present constitutes one cell structure.

When it is described that two cell structures are "different cell structures", it is meant that in case of comparison of the two cell structures, the structures are different in one of a partition wall thickness, a cell density and a cell shape. Here, when "the structures are different in partition wall thickness", it is meant that in case of the comparison of the partition wall thicknesses of the two cell structures, there is a difference of 25 μm or more. Furthermore, when "the structures are different in cell density", it is meant that in case of the comparison of the cell densities of the two cell structures, there is a difference of 7 cells/cm$^2$ or more.

The die of the present embodiment is suitably usable in formation of a honeycomb formed body to manufacture the honeycomb structure 200 shown in FIG. 8 to FIG. 10. Hereinafter, a more suitable configuration of the die of the present embodiment will be described.

In the die of the present embodiment, it is preferable that the shape of the first slits 11 is different from the shape of the second slits 21 as shown in FIG. 1 to FIG. 7. There are not any special restrictions on the shape of the first slits 11 and the shape of the second slits 21, and the shapes are suitably selectable in accordance with the cell structure of the honeycomb formed body to be formed.

The groove region 31 formed in the abutment surfaces 14 and 24 of the first die 10 and the second die 20 may be formed on the side of the first die 10 or the second die 20.

In the die 100 of the present embodiment, it is preferable that the groove region 31 is formed on the second die 20 side. When the groove region 31 is formed on the second die 20 side, strength of the die 100 is preferably acquired, and the die is preferably easy to manufacture. For example, the groove region 31 is formed on the second die 20 side, whereby even when stress to be applied to the groove region 31 becomes the stress in a compressing direction and stress concentration occurs in the groove region 31, it is possible to acquire the strength of the die 100.

There is not any special restriction on a width of the groove region 31, but the width is preferably from 0.1 to 1.5 mm and especially preferably from 0.3 to 0.7 mm. When the width of the groove region 31 is smaller than 0.1 mm, an extrusion resistance during extrusion unfavorably increases. On the other hand, when the width of the groove region 31 is in excess of 1.5 mm, a contact area of the first die with the second die is unfavorably excessively small, and fluidity unfavorably varies due to deformation of an abutment region.

There is not any special restriction on a depth of grooves of the groove region 31 in the extruding direction X, but the depth is preferably from 0.1 to 5.0 mm and especially preferably from 0.3 to 1.2 mm. When the depth of the groove region 31 is smaller than 0.1 mm, the extrusion resistance during the extrusion unfavorably increases. On the other hand, when the depth of the groove region 31 is in excess of 5.0 mm, a substantial thickness of the second die unfavorably decreases, and strength of the whole die unfavorably deteriorates.

A ratio, to an area of a range 32 where the groove region 31 is formed in the abutment surface 24 of the second die 20, of a total area of the groove region 31 and open ends of the second kneaded material introducing holes 22 in the range is preferably from 40 to 90% and especially preferably from 50 to 80%. Here, "the range 32 where the groove region 31 is formed in the abutment surface 24 of the second die 20" means a range surrounded by lines which connect terminal ends of the respective grooves of the groove region 31 in the abutment surface 24 of the second die 20. In FIG. 5, a range surrounded by a broken line denoted with reference numeral 32 is "the range 32 where the groove region 31 is formed". Therefore, the area of the range 32 where the groove region 31 is formed as described above includes the areas of the groove region 31 and the open ends of the second kneaded material introducing holes 22 in the range. When the above-mentioned ratio is smaller than 40%, the extrusion resistance during the extrusion unfavorably increases. On the other hand, when the ratio is in excess of 90%, the contact area of the first die with the second die unfavorably becomes excessively small and the fluidity unfavorably varies due to the deformation of the abutment region.

There is not any special restriction on a shape of the groove region 31 in the abutment surface 24 of the second die 20. For example, it is preferable that the shape is a latticed shape to connect two open ends close to each other by a straight line among the open ends of the second kneaded material introducing holes 22 in the abutment surface 24 of the second die 20. Such a constitution is capable of minimizing the deterioration of the strength of the die 100. It is to be noted that the constitution may further include the groove region 31 having a shape to connect the open end of one second kneaded material introducing hole 22 to the open end of the second kneaded material introducing hole 22 which is present at a position away from the second kneaded material introducing hole 22 close to the one second kneaded material introducing hole.

The die of the present embodiment may have two or more second dies 20, when the groove region 31 is formed in the abutment surface 24 of the second die 20 as shown in FIG. 1 to FIG. 7. In the respective second dies 20, the depth of the groove region 31 formed in the abutment surface 24 varies, and hence, when the second die 20 is replaced, the depth of the grooves of the groove region 31 is changeable. For example, the second die in which the depth of the grooves of the groove region 31 is optimum may suitably be selected for use from the two or more second dies 20 in accordance with formation conditions during the extrusion.

Furthermore, although not shown in the drawings, the die may have two or more first dies, when the groove region is formed in the abutment surface of the first die. In the respective first dies, the depth of the groove region formed in the abutment surface varies, and hence, when the first die is replaced, the depth of the grooves of the groove region is changeable. For example, the first die in which the depth of the grooves of the groove region is optimum may suitably be selected for use from the two or more first dies in accordance with the formation conditions during the extrusion.

A ratio of an area of the central region 15 of the first die 10 to an area of an end face of the honeycomb formed body to be extruded can suitably be determined in accordance with the cell structures of the central portion and circumferential portion of the honeycomb formed body to be formed (e.g., see FIG. 8 to FIG. 10). It is to be noted that in the die of the present embodiment, the above ratio is preferably from 30 to 70% and especially preferably from 40 to 60%.

As described above, in the die 100, the cavity region 26 in the central region 25 of the second die 20 is formed to be slightly larger than the peripheral edge of the convex region 16 of the first die 10, and the ring-shaped clearance region 35 is formed between the convex region 16 of the first die 10 and the second die 20. There is not any special restriction on an interval between the ring-shaped clearance regions 35 mentioned above, and the interval is suitably selectable in accordance with a thickness of the boundary wall of the honeycomb formed body to be formed. For example, it is preferable that the interval between the ring-shaped clearance regions 35 is from 0.04 to 0.50 mm.

In the first die 10, it is preferable that the central region 15 is the same as the circumferential region 17 in an opening diameter of the first kneaded material introducing hole 12 and an interval between the first kneaded material introducing holes 12. According to such a constitution, for example, it is possible to easily manufacture the first die 10 at low cost.

Figure 11:
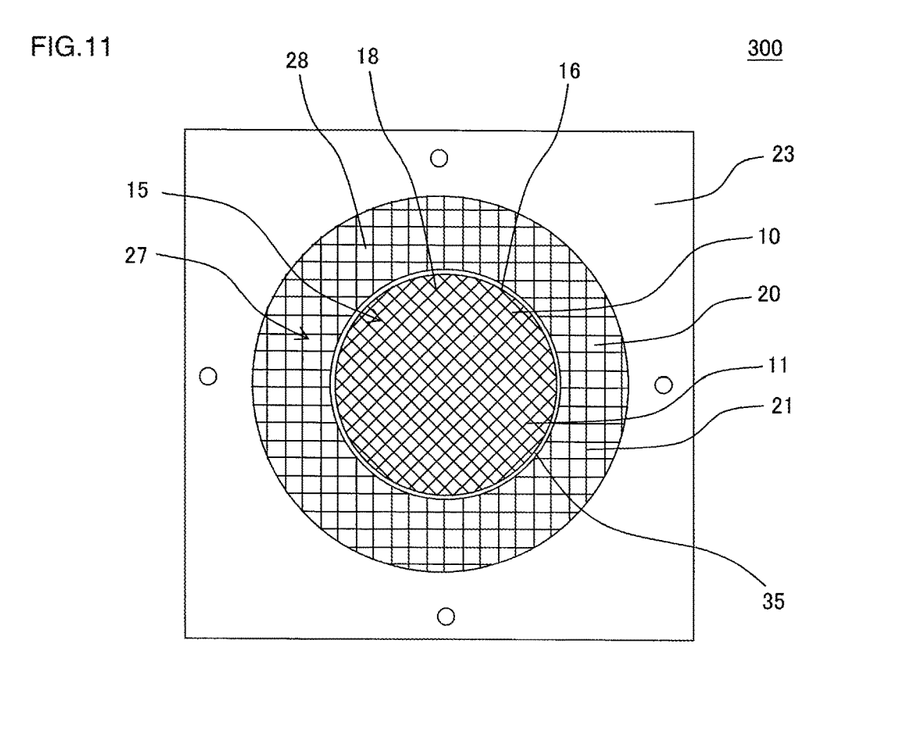
FIG. 11 is a plan view schematically showing a kneaded material discharging surface side of another embodiment of the honeycomb structure forming die of the present invention.

Furthermore, in the die of the present embodiment, slits surrounding one cell among the first slits and slits surrounding one cell among the second slits may extend in mutually intersecting directions. Here, "the cell" means a space defined by partition walls in the honeycomb formed body to be formed. For example, a die 300 shown in FIG. 11 is prepared in a state where the first slits 11 of the first die 10 are rotated clockwise as much as 45° from the die 100 shown in FIG. 1. Consequently, in the die 300, slits surrounding one cell among the first slits 11 and slits surrounding one cell among second slits 21 do not have a parallel positional relation. In the die of the present embodiment, even when the slits surrounding the respective cells intersect with one another in the first slits and the second slits as described above, it is possible to uniformize the flow rate distribution of the kneaded material. Therefore, it is possible to uniformize the amount of the kneaded material to be discharged from the second slits of the second die and it is possible to form the honeycomb formed body in a high quality.

In the die 100 of the present embodiment, as shown in FIG. 1, an arranging direction of the cell structure of the honeycomb formed body to be extruded through the first slits 11 is parallel to an arranging direction of the cell structure of the honeycomb formed body to be extruded through the second slits 21. In other words, an extending direction of the first slits 11 of the first die 10 is parallel to an extending direction of the second slits 21 of the second die 20. However, as in the die 300 shown in FIG. 11, the arranging direction of the cell structure of the honeycomb formed body to be extruded through the first slits 11 and the arranging direction of the cell structure of the honeycomb formed body to be extruded through the second slits 21 may extend in mutually intersecting directions. FIG. 11 is a plan view schematically showing a kneaded material discharging surface side of another embodiment of the honeycomb structure forming die of the present invention. In the die 300 shown in FIG. 11, constituent elements similar to those of the die 100 shown in FIG. 1 are denoted with the same reference numerals and description thereof is omitted sometimes.

The die 300 shown in FIG. 11 also includes a groove region 31 (see FIG. 7) in which movement of a kneaded material is performed between a first kneaded material introducing hole 12 and a second kneaded material introducing hole 22, in abutment surfaces 14 and 24 of a first die 10 and a second die 20 (see FIG. 7). Consequently, also when an extending direction of the first slits 11 of the first die 10 and an extending direction of the second slits 21 of the second die 20 intersect with each other as in the die 300 shown in FIG. 11, it is possible to uniformize the flow rate distribution of the kneaded material. Therefore, it is possible to uniformize an amount of the kneaded material to be discharged from the second slits 21 of the second die 20 and it is possible to form the honeycomb formed body in a high quality.

The die 300 shown in FIG. 11 is beforehand prepared so that the first slits 11 of the first die 10 are rotated clockwise as much as 45°. However, for example, the die 100 shown in FIG. 1 is usable by rotating the first die 10 clockwise as much as 45°. Also when the first die 10 of the die 100 shown in FIG. 1 is rotated clockwise as much as 45°, the groove region 31 is present in the abutment surfaces 14 and 24 of the first die 10 and the second die 20 as shown in FIG. 6 and FIG. 7, and hence the movement of the kneaded material in the die 100 is not obstructed. A conventional die which does not have the groove region is designed so that, for example, the first kneaded material introducing holes of the first die match the second kneaded material introducing holes of the second die in the extruding direction of the kneaded material. Consequently, when the first die is only rotated for use, the movement of the kneaded material in the die might be obstructed.

In the die of the present embodiment shown in FIG. 1 to FIG. 7, there are not any special restrictions on a thickness of the first die 10, a projecting height of the convex region 16 of the first die 10 and a thickness of the second die 20. It is preferable that the thickness of the first die 10 is from 10 to 50 mm. It is preferable that the projecting height of the convex region 16 of the first die 10 is from 5 to 30 mm. It is preferable that the thickness of the second die 20 is from 5 to 30 mm. It is to be noted that the projecting height of the convex region 16 of the first die 10 may be the same as or different from the thickness of the second die 20. For example, when the convex region 16 of the first die 10 is inserted into the cavity region 26 of the ring-shaped second die 20, a position of the kneaded material discharging surface 18 of the first die 10 may match or does not have to match a position of the kneaded material discharging surface 28 of the second die 20.

An example of a material of a first die substrate 13 constituting the first die 10 and a second die substrate 23 constituting the second die 20 is a metal or an alloy which is usually used as a material of the honeycomb structure forming die. Hereinafter, the first die substrate and the second die substrate will generically be referred to simply as "the die substrate" sometimes. An example of the material of the die substrate is a metal or an alloy including at least one metal selected from the group consisting of iron (Fe), titanium (Ti), nickel (Ni), copper (Cu) and aluminum (Al).

An example of the alloy for use as the material of the die substrate is stainless alloy, more specifically SUS630. This stainless alloy is an inexpensive material which is comparatively easy to process. Another example of the alloy constituting the die substrate is tungsten carbide based cemented carbide which is excellent in wear resistance. By use of the die substrate made of tungsten carbide based cemented carbide or the like, it is possible to manufacture the honeycomb structure forming die in which the slits wear away less.

There is not any special restriction on a method of manufacturing the die of the present embodiment. For example, the die of the present embodiment can be manufactured in conformity with a heretofore known die manufacturing method.

The first kneaded material introducing holes and the second kneaded material introducing holes can be formed by using known machine processing such as drill processing, discharge processing, electrolytic processing or laser processing to the first die substrate and the second die substrate.

The first slits and the second slits can be formed by using known machine processing such as grind processing, discharge processing, electrolytic processing or laser processing to the first die substrate and the second die substrate.

The groove region of the abutment surfaces of the first die and the second die can be formed by using known machine processing such as grind processing, discharge processing, or laser processing.

The convex region constituting the central region of the first die can be formed by grind processing, discharge processing, or bonding of two members.

EXAMPLES

Hereinafter, the present invention will further specifically be described with reference to examples, but the present invention is not restricted by these examples.

Example 1

In Example 1, a die was manufactured to prepare a honeycomb structure 200 of a cell structure in which a central cell structure 215 of a honeycomb structure body 204 was different from a circumferential cell structure 216 as shown in FIG. 8 to FIG. 10. More specifically, in Example 1, the die was prepared so that the honeycomb structure of a final product was constituted as follows. The honeycomb structure of the final product had a round pillar shape in which a diameter of each end face was 100 mm, and a diameter of the central cell structure in the end face was 70 mm. The honeycomb structure had a boundary wall having a thickness of 0.1 mm in a boundary between the central cell structure and the circumferential cell structure. In the central cell structure, a cell shape was quadrangular, a partition wall thickness was 0.09 mm, and a cell density was 93 cells/cm$^2$. In the circumferential cell structure, a cell shape was quadrangular, a partition wall thickness was 0.11 mm, and a cell density was 62 cells/cm$^2$. It is to be noted that each dimension of the above honeycomb structure does not include any manufacturing tolerances.

Initially in Example 1, there was prepared a plate-shaped first die substrate in which a vertical dimension was 200 mm, a lateral dimension was 200 mm and a thickness was 20 mm. One surface of the prepared first die substrate was defined as a kneaded material discharging surface, and a convex region was formed by discharge processing so that a projecting length was 10 mm.

Next, in the kneaded material discharging surface of the convex region of the first die substrate, latticed first slits were formed. The latticed first slits were formed into a slit shape to extrude partition walls constituting the central cell structure of the above-mentioned honeycomb structure of the final product. The first slits were formed by grind processing.

Next, in a kneaded material introducing surface of the first die substrate, first kneaded material introducing holes having an opening diameter of 1.2 mm were formed to communicate with intersection points of the first slits. Also in a circumferential region of the first die substrate which did not have the convex region, the first kneaded material introducing holes were formed at the same pitch as in a central region having the convex region. The first kneaded material introducing holes of the circumferential region of the first die substrate were through-holes extending from a kneaded material introducing surface of the first die substrate to an after-mentioned abutment surface with a second die. As described above, a first die in the die of Example 1 was prepared.

Next, there was prepared a plate-shaped second die substrate in which a vertical dimension was 200 mm, a lateral dimension was 200 mm and a thickness was 10 mm. The die substrate was made of stainless steel. A central region of the prepared second die substrate was hollowed out into a round shape to form the second die substrate into a ring shape.

Next, in a kneaded material discharging surface of a convex region of the second die substrate, latticed second slits were formed. The latticed second slits were formed into a slit shape to extrude partition walls constituting the circumferential cell structure of the above-mentioned honeycomb structure of the final product. The second slits were formed by grind processing.

Next, in the surface of the second die substrate opposite to the kneaded material discharging surface, second kneaded material introducing holes having an opening diameter of 1.2 mm were formed to communicate with intersection points of the second slits. When the second die substrate is combined with the first die substrate, the surface of the second die substrate opposite to the kneaded material discharging surface becomes the abutment surface which comes in contact with the circumferential region of the first die substrate.

Next, in the above abutment surface of the second die substrate, there was formed a groove region in which movement of the kneaded material was performed between the first kneaded material introducing hole and the second kneaded material introducing hole. This groove region had a latticed shape to connect two open ends close to each other by a straight line among open ends of the second kneaded material introducing holes. A width of the groove region was set to 0.5 mm and a depth of the groove region in an extruding direction was set to 0.5 mm. The groove region was formed by grind processing. As described above, the second die in the die of Example 1 was prepared.

Next, the second die was combined with the first die to insert the convex region of the central region of the first die into the cavity region of the central region of the second die, and thus, the die of Example 1 was manufactured. A ratio, to an area of a range where the groove region was formed in the abutment surface of the second die, of an area of open ends of the groove region in the range was 71%. Hereinafter, the area of the open ends of the above-mentioned groove region will be referred to as "an area ratio of the groove region" sometimes. Table 1 shows "a die structure", "presence of the groove region", "a width (mm) of the groove region", "a depth (mm) of the groove region", and "the area ratio (%) of the groove region". It is to be noted that the table shows a die as "two-body assembly" in a column of "the die structure" when the die is manufactured by combining the first die and the second die into one die as in the die of Example 1. On the other hand, the table shows a die as "a monolithic structure" in the column of "the die structure" when the die is manufactured by preparing one die substrate so that a central region is different from a circumferential region in shape of slits.

A total operation time required in manufacturing the die of Example 1 was 70 hours. "A formed body quality", "an extrusion resistance" and "presence of deformation of the second die" were evaluated by using the die of Example 1 by such methods as described below. Table 1 shows the results.

(Formed Body Quality)

A honeycomb structure constituted of a cordierite composition was extruded by using the prepared die. The extruded honeycomb structure was visually confirmed, and the quality of the honeycomb structure was evaluated in accordance with the following evaluation standards. When there are not any appearance defects, a formed body is evaluated as "good". When there is the appearance defect or formation cannot be performed, the formed body is evaluated as "failure". Here, "the appearance defect" indicates that partition walls constituting the honeycomb structure bend due to extrusion rate deviations in respective regions of the die.

(Extrusion Resistance)

A pressure sensor was disposed on an upstream side of the prepared die, and a honeycomb structure constituted of a cordierite composition was extruded by using the die including the pressure sensor. A pressure on the upstream side of the die during the extrusion was measured with the pressure sensor and the measured pressure was obtained as an extrusion resistance of the die of an evaluation target. The extrusion resistance during the extrusion was evaluated in accordance with the following evaluation standards. A range of the pressure during production of a usual honeycomb product is defined as "a standard", an extrusion resistance higher than "the standard" is evaluated as a "large" extrusion resistance, and an extrusion resistance smaller than "the standard" is evaluated as a "small" extrusion resistance.

(Presence of Deformation of Second Die)

By use of the prepared die, extrusion was performed three times on the same conditions as in the evaluation of the formed body quality, and in a stage where the extrusions ended, presence of deformation of the second die was visually confirmed. When the deformation is confirmed in the second die, the table shows "present" in a corresponding column, and when any deformations are not confirmed in the second die, the table shows "none" in the corresponding column.

TABLE 1

| | Die structure | Presence of groove region | Width of groove region (mm) | Depth of groove region (mm) | Area ratio of groove region (%) | Total operation time required in manufacturing (hours) | Extrusion resistance | Formed body quality | Presence of deformation of second die |
|---|---|---|---|---|---|---|---|---|---|
| Example 1 | Two-body assembly | Present | 0.5 | 0.5 | 71 | 70 | Standard | Good | None |
| Example 2 | Two-body assembly | Present | 0.5 | 0.7 | 76 | 70 | Small | Good | None |
| Example 3 | Two-body assembly | Present | 0.7 | 1 | 80 | 70 | Small | Good | None |
| Example 4 | Two-body assembly | Present | 0.5 | 0.3 | 71 | 70 | Large | Good | None |
| Comparative Example 1 | Monolithic structure | — | — | — | — | 100 | Small | Failure | None |
| Comparative Example 2 | Two-body assembly | None | — | — | — | 60 | Large | Failure | None |
| Comparative Example 3 | Two-body assembly | None (the whole abutment surface is a hollow) | — | — | — | 70 | Small | Good (provided that the quality deteriorates with deformation) | Present |

Examples 2 to 4

The procedure of Example 1 was repeated except that "a width (mm) of a groove region", "a depth (mm) of the groove region" and "an area ratio (%) of the groove region" were changed to such values as shown in Table 1, to manufacture dies. The procedure of Example 1 was repeated to perform evaluations of "formed body quality", "extrusion resistance" and "presence of deformation of a second die" by use of the dies of Examples 2 to 4. Table 1 shows the results.

Comparative Example 1

In Comparative Example 1, there was prepared a plate-shaped die substrate in which a vertical dimension was 200 mm, a lateral dimension was 200 mm and a thickness was 20 mm. The die substrate was made of stainless steel. One surface of the prepared die substrate was defined as a kneaded material discharging surface, and in a central region on the side of the kneaded material discharging surface, slits having the same shape as in first slits of the die of Example 1 were formed. Next, in a circumferential region on the side of the kneaded material discharging surface of the die substrate, slits having the same shape as in second slits of the die of Example 1 were formed. Next, at a position corresponding to a clearance region of Example 1, a ring-shaped slit was formed to connect an end of each first slit to an end of each second slit. Next, from the side of a kneaded material introducing surface of the die substrate, kneaded material introducing holes having an opening diameter of 1.2 mm were formed to communicate with intersection points of the respective slits. As described above, a die of Comparative Example 1 was manufactured.

A total operation time required in manufacturing the die of Comparative Example 1 was 100 hours. The procedure of Example 1 was repeated to perform evaluations of "formed body quality", "extrusion resistance" and "presence of deformation of a second die" by use of the die of Comparative Example 1. Table 1 shows the results.

Comparative Example 2

In Comparative Example 2, there was initially prepared a first die constituted in the same manner as in the first die of the die of Example 1. Next, in Comparative Example 2, a second die was prepared without forming any groove regions in an abutment surface of a second die substrate as in the die of Example 1. The second die was combined with the first die to insert a convex region of a central region of the first die into a cavity region of a central region of this second die, and thus, a die of Comparative Example 2 was manufactured.

A total operation time required in manufacturing the die of Comparative Example 2 was 60 hours. The procedure of Example 1 was repeated to perform evaluations of "formed body quality", "extrusion resistance" and "presence of deformation of the second die" by use of the die of Comparative Example 2. Table 1 shows the results.

Comparative Example 3

In Comparative Example 3, there was initially prepared a first die constituted in the same manner as in the first die of the die of Example 1. Next, in Comparative Example 3, a second die was prepared in which a region of 0.5 mm from an abutment surface of a second die substrate in an extruding direction was removed by discharge processing without forming any groove regions in the abutment surface of the second die substrate as in the die of Example 1. The second die was combined with the first die to insert a convex region of a central region of the first die into a cavity region of a central region of the second die, and thus, a die of Comparative Example 3 was manufactured. In the die of Comparative Example 3, an end face of a circumferential region of the first die on a downstream side did not abut on an end face of the second die on an upstream side, and the second die in a cantilever state was combined with the first die.

A total operation time required in manufacturing the die of Comparative Example 3 was 70 hours. The procedure of Example 1 was repeated to perform evaluations of "formed body quality", "extrusion resistance" and "presence of deformation of the second die" by use of the die of Comparative Example 3. Table 1 shows the results.

(Results)

In the dies of Examples 1 to 4, it was possible to shorten the manufacturing time and evaluations of the formed body qualities were suitable, as compared with the die of Comparative Example 1. Also in the evaluation of the presence of the deformation of the second die, any deformation of the second die was not confirmed.

The die of Comparative Example 1 had a result of failure in the evaluation of the formed body quality. The reasons for this result are supposedly that when the central region of the die is different from the circumferential region thereof in shape of slits, a flow rate distribution of the kneaded material in the die easily becomes non-uniform, and an amount of the kneaded material to be discharged from the slits does not become uniform. Furthermore, when extrusion was performed by using the die of Comparative Example 1, requirements exceeded supply of the kneaded material to form a boundary wall, and a lot of formation defects were confirmed in the boundary wall and its vicinity.

As to the die of Comparative Example 2, in a region where positions of first kneaded material introducing holes of the first die did not match those of second kneaded material introducing holes of the second die, movement of the kneaded material was obstructed, and a result of failure was obtained in the evaluation of the formed body quality. Furthermore, when extrusion was performed by using the die of Comparative Example 2, requirements exceeded supply of the kneaded material to form the boundary wall, and formation defects were remarkably confirmed in the boundary wall and its vicinity.

In the die of Comparative Example 3, the evaluation of the formed body quality was suitable, but in the evaluation of the presence of the deformation of the second die, the deformation of the second die was confirmed. When the second die is remarkably deformed, the formed body quality might be influenced. Furthermore, when the second die is easy to deform, there is the fear that manufacturing cost of a product increases due to replacement of the die, or the like.

A honeycomb structure forming die of the present invention is utilizable in manufacturing a honeycomb formed body having a central portion different from a circumferential portion in cell structure.

DESCRIPTION OF REFERENCE NUMERALS

10: first die, 11: first slit, 12: first kneaded material introducing hole, 13: first die substrate, 14: abutment surface (the abutment surface of the first die), 15: central region, 16: convex region, 17: circumferential region, 18: kneaded material discharging surface (the kneaded material discharging surface of the first die), 19: kneaded material introducing surface, 20: second die, 21: second slit, 22: second kneaded material introducing hole, 23: second die substrate, 24: abutment surface (the abutment surface of the second die), 25: central region, 26: cavity region, 27: circumferential region, 28: kneaded material discharging surface (the kneaded material discharging surface of the second die), 31: groove region, 32: range where the groove region is formed, 35: clearance region (a boundary wall forming clearance region), 100 and 300: honeycomb structure forming die (the die), 201: partition wall, 202: cell, 202a: cell (cells of a central cell structure), 202b: cell (cells of a circumferential cell structure), 203: circumferential wall, 204: honeycomb structure body, 208: boundary wall, 211: inflow end face, 212: outflow end face, 215: central cell structure, 216: circumferential cell structure, 200: honeycomb structure, and X: extruding direction.

What is claimed is:

1. A honeycomb structure forming die comprising:
a first die disposed on an upstream side in an extruding direction of a kneaded material of a forming raw material, having a central convex region projecting toward a downstream side in the extruding direction and a circumferential region surrounding the central convex region and having an upper abutment surface;
an annular second die having a lower abutment surface disposed on the upper abutment surface of the circumferential region and having an inner peripheral surface complementary to an outer peripheral surface of the convex region, the first die and the second die being rotatable with respect to each other between a non-rotated position and a rotated position,
a first plurality of first kneaded material introducing holes and latticed first slits communicating with the first plurality of first kneaded material introducing holes formed in the central convex region,
a second plurality of the first kneaded material introducing holes formed in the circumferential region, and
a plurality of second kneaded material introducing holes formed in the annular second die configured to receive the kneaded material discharged from the second plurality of first kneaded material introducing holes formed in the circumferential region, and latticed second slits communicating with the plurality of second kneaded material introducing holes,
wherein, in the non-rotated position, at least a portion of outlet openings of the second plurality of first kneaded material introducing holes of the circumferential region do not match inlet openings of the second kneaded material introducing holes of the annular second die,
wherein a clearance region configured to extrude the kneaded material into a ring shape is defined between the outer peripheral surface of the convex region and the inner peripheral surface of the annular second die;
wherein at least one groove region is defined in the lower abutment surface of the annular second die, through which, in the rotated position, the kneaded material moves between at least one of the second plurality of the first kneaded material introducing holes and at least one of the second kneaded material introducing holes; and
wherein the at least one groove region comprises a first plurality of grooves extending in a first direction and a second plurality of grooves extending in a second direction orthogonal to the first direction defining a latticed shape, each groove of the plurality of the first and second plurality of grooves in the latticed shape being configured to connect two open ends, among open ends of the plurality of the second kneaded material introducing holes.

2. The honeycomb structure forming die according to claim 1, wherein a shape of the first slits is different from a shape of the second slits.

3. The honeycomb structure forming die according to claim 1, wherein a width of the at least one groove region is from 0.1 to 1.5 mm.

4. The honeycomb structure forming die according to claim 1, wherein a depth of grooves of the at least one groove region is from 0.1 to 5.0 mm.

5. The honeycomb structure forming die according to claim 1, wherein a ratio, to an area of a range where the at least one groove region is formed in the abutment surface of the second die, of a total area of the at least one groove region and open ends of the second kneaded material introducing holes in the range is from 40 to 90%.

6. The honeycomb structure forming die according to claim 1, wherein a ratio of an area of the central region of the first die to an area of an end face of a honeycomb formed body formed by the die is from 30 to 70%.

7. The honeycomb structure forming die according to claim 1,
wherein slits surrounding one cell among the first slits and slits surrounding one cell among the second slits extend in mutually intersecting directions.

8. The honeycomb structure forming die according to claim 1,
wherein an arranging direction of a cell structure of the honeycomb formed body which is to be extruded through the first slits and an arranging direction of a cell structure of the honeycomb formed body which is to be extruded through the second slits extend in mutually intersecting directions.

9. The honeycomb structure forming die according to claim 1,
wherein in the first die, the central region is the same as the circumferential region in an opening diameter of the first kneaded material introducing hole and an interval between the first kneaded material introducing holes.

10. The honeycomb structure forming die according to claim 1, comprising two or more second dies,
wherein the second die is replaced, whereby a depth of grooves of the at least one groove region is changeable.

11. The honeycomb structure forming die according to claim 1, comprising two or more first dies,
wherein the first die is replaced, whereby a depth of grooves of the at least one groove region is changeable.

* * * * *